United States Patent
Ono et al.

(10) Patent No.: US 10,372,422 B2
(45) Date of Patent: Aug. 6, 2019

(54) PERFORMANCE VERIFICATION DEVICE FOR VERIFYING PERFORMANCE OF PROGRAM, METHOD, AND RECORDING MEDIUM HAVING PROGRAM RECORDED THEREON FOR CAUSING COMPUTER TO PERFORM THE METHOD

(71) Applicant: RENESAS ELECTRONICS CORPORATION, Tokyo (JP)

(72) Inventors: Rika Ono, Tokyo (JP); Koichi Sato, Kodaira (JP)

(73) Assignee: RENSAS ELECTRONICS CORPORATION, Tokyo (JP)

( * ) Notice: Subject to any disclaimer, the term of this patent is extended or adjusted under 35 U.S.C. 154(b) by 265 days.

(21) Appl. No.: 15/140,168

(22) Filed: Apr. 27, 2016

(65) Prior Publication Data
US 2016/0321037 A1    Nov. 3, 2016

(30) Foreign Application Priority Data

Apr. 28, 2015 (JP) ................. 2015-091968

(51) Int. Cl.
  *G06F 9/44* (2018.01)
  *G06F 8/30* (2018.01)
  *G06F 8/20* (2018.01)
  *G06F 8/35* (2018.01)
  *G06F 9/455* (2018.01)

(52) U.S. Cl.
  CPC ............... *G06F 8/30* (2013.01); *G06F 8/20* (2013.01); *G06F 8/35* (2013.01); *G06F 9/455* (2013.01)

(58) Field of Classification Search
  CPC ......... G06F 8/451; G06F 8/458; G06F 9/3842
  See application file for complete search history.

(56) References Cited

U.S. PATENT DOCUMENTS

| | | | |
|---|---|---|---|
| 7,222,218 B2 * | 5/2007 | Dutt | G06F 8/451 710/244 |
| 8,219,378 B1 * | 7/2012 | Koh | G06F 8/30 703/20 |
| 9,251,308 B2 * | 2/2016 | Kajitani | G06F 17/5009 |
| 2003/0110468 A1 | 6/2003 | Maki | |

(Continued)

FOREIGN PATENT DOCUMENTS

| | | |
|---|---|---|
| JP | 2003-173256 A | 6/2003 |
| JP | 2011-154521 A | 8/2011 |
| JP | 2014-102734 A | 6/2014 |

OTHER PUBLICATIONS

Canedo et al., "Automatic Parallelization of Simulink Applications," Proceedings of the 8th Annual IEEE/ACM International Symposium on Code Generation and Optimization, Apr. 24-28, 2010, pp. 151-159.

(Continued)

*Primary Examiner* — Duy Khuong T Nguyen
(74) *Attorney, Agent, or Firm* — McDermott Will & Emery LLP

(57) ABSTRACT

When generating a source code executed by a multi-core processor in order to verify performance of a control system, a device generates the source code as an object of execution by the multi-core processor from a control model, performs cooperative simulation, and measures an execution time of a program in the multi-core processor in the cooperative simulation.

15 Claims, 13 Drawing Sheets

(56) References Cited

U.S. PATENT DOCUMENTS

| | | | | |
|---|---|---|---|---|
| 2010/0011237 A1* | 1/2010 | Brooks | ............ | G06F 9/455 |
| | | | | 713/502 |
| 2010/0269102 A1* | 10/2010 | Latorre | ............ | G06F 9/3842 |
| | | | | 717/130 |
| 2015/0309920 A1* | 10/2015 | Ishigooka | ............ | G06F 11/3688 |
| | | | | 717/126 |
| 2016/0291950 A1* | 10/2016 | Yatou | ............ | G06F 8/458 |

OTHER PUBLICATIONS

Suzuki et al., "Designing Evaluation Functions of Multi Core Task Mapping for Hard Real-Time Systems," Information Processing Society of Japan SIG Technical Report, 2011-SLDM-149(16), Mar. 18, 2011, pp. 1-6 (w/English Abstract).

Masato Edahiro, "Implementation of Embedded Control Systems on Multi-Many-Core Processors," The Society of Instrument and Control Engineers, Journal of the Society of Instrument and Control Engineers, 53(12), Dec. 2014, pp. 1111-1116. (Discussed on p. 6 of the Specification.).

\* cited by examiner

FIG.12

```
BOOLEAN Is_PEID (int ID) {
   return (S_getPE() == ID);
} define PE1   1
define PE2   2
#define PE3   3
```
} 1210

```
/* Model step function */
void ABC_Subsystem_step(void)
{
   ...
   {
      /* user code (Output function Header) */
         F_sync(3);
         ...
```
} 1220

```
      /* Outputs for Enabled SubSystem: '<S620>/If Action Subsystem' incorporates */
         if (Is_PEID( PE2 )) {
         ...
```
} 1230

```
         /* user code (Update function Trailer) */
            F_set(2);
         }
         ...
```
} 1240

```
      /* Outputs for Enabled SubSystem: '<S640>/If Action Subsystem1' incorporates */
         if (Is_PEID( PE3 )) {
         ...
```
} 1230

```
         /* user code (Update function Trailer) */
            F_set(3);
         }
         ...
```
} 1240

```
      /* Outputs for Enabled SubSystem: '<S650>/If Action Subsystem4' incorporates */
         if (Is_PEID( PE1 )) {
            {
            /* user code (Output function Header) */
               F_wait(2);
               F_wait(3);
            ...
            }
```
} 1240

```
      /* user code (Update function Trailer) */
         F_sync(3);
      }
```
} 1250

PERFORMANCE VERIFICATION DEVICE FOR VERIFYING PERFORMANCE OF PROGRAM, METHOD, AND RECORDING MEDIUM HAVING PROGRAM RECORDED THEREON FOR CAUSING COMPUTER TO PERFORM THE METHOD

This nonprovisional application is based on Japanese Patent Application No. 2015-091968 filed on Apr. 28, 2015, with the Japan Patent Office, the entire contents of which are hereby incorporated by reference.

BACKGROUND OF THE INVENTION

Field of the Invention

The present disclosure relates to a technique of verifying the performance of a program, and more specifically to a technique of verifying the performance of a program executed on a multi-core processor.

Description of the Background Art

An MBD (model-based design) tool utilized for vehicle control, signal processing and the like can use hierarchies from a high-order design hierarchy to a low-order ECU (electronic control unit) implementation hierarchy, in which MIL (Model-in-the-Loop) simulation and SIL (Software-in-the-Loop) simulation are successively used from the higher order position for testing of a control algorithm. Further, testing of codes mass-produced by a microcomputer includes an environment called PIL (Processor-in-the-Loop) simulation. In the PIL simulation environment where the MBD tool is used, the function of a program code generated for a single-core processor is verified. For example, Patent Document 1 (Japanese Patent Laying-Open No. 2003-173256) and Patent Document 2 (Japanese Patent Laying-Open No. 2011-154521) each disclose a method of generating a program code using a model-based development process and a system for making a performance evaluation.

In the PIL simulation environment, simulation can be performed by cooperation between a Simulink model mathematically representing the behavior of a controlled object or a controller, and a microcomputer or a microcomputer simulator. Examples of products of the PIL simulation environment include "ECPILS" of Renesas Electronics Corporation, which is an embedded tool chain for cooperative simulation with a Simulink model, and "SOFTUNE" of Spansion Innovates.

In ECPILS, a microcomputer evaluation board via an emulator communicates with a MATLAB/Simulink model simulation environment running on a PC (personal computer) and provided by The Mathworks, Inc, to implement PIL simulation. Instead of the microcomputer evaluation board, a microcomputer simulator running on a PC can communicate with the aforementioned model simulation environment to implement cooperative simulation.

That is, in the PIL simulation environment, C source code automatically generated from a model of a controller is executed by a microcomputer or a microcomputer simulator, so that it can be verified by simulation whether or not the behavior of a model of a controlled object called the plant can be controlled as intended by the designer.

In vehicle control and the like, the amount of computation has significantly increased in recent years due to sophistication of control such as stricter energy-saving fuel economy standards and tighter emission control standards. Thus, high computing process capability is expected even in a high-temperature operation environment such as an engine room. However, there is little room for improvement in microcomputer operating frequency in a high-temperature environment. Since a microcomputer is mounted on a vehicle, it is desirable for the microcomputer to consume less power because it reduces power supply, and reducing the number of components of the microcomputer can suppress an increase in vehicle weight, thereby also contributing to improved fuel efficiency. Thus, there exists a need for a development environment for control processing using a multi-core microcomputer having a feasible operating frequency and having a plurality of low-power-consumption CPU (central processing unit) cores mounted thereon.

In feedback control or closed loop control, which is one of the basic control schemes, a value from a sensor and a target value are input to a controller, and a control value is output to an actuator to control the object.

The closed loop control is widely used in vehicle control as well. Particularly, in a system designed based on a very short control cycle of between several tens of microseconds and several milliseconds for engine control, for example, the program of a controller needs to be created such that the controller can determine the amount of operation and output the determined amount of operation to the actuator without exceeding the control cycle time that has been set to satisfy various standards. Therefore, if vehicle control is to be implemented by a multi-core microcomputer, it is required to obtain the exact execution time including phenomena specific to multiple cores, such as communication overhead between the cores, and delay due to a conflict on a data bus.

The conventional techniques disclosed in Patent Documents 1 to 2 are model-based development techniques where a single-core processor is used. By contrast, in a conventional technique disclosed in Patent Document 3 (Japanese Patent Laying-Open No. 2014-102734), each of a plurality of tasks constituting the program of a controller is executed with a single core to calculate the execution time, to estimate a time of allocation of each task to any one of multiple cores and a processing time in the allocation.

That is, all of the conventional techniques merely implement simulation by cooperation with a single-core microcomputer, and none provides PIL simulation to parallel programs operated with multiple cores. This is partly because a complicated control procedure is required for simulation by cooperation between N programs executed by a multi-core microcomputer formed of N cores and a model simulator such as Simulink running on a PC, and such a control procedure has been considered to be incompatible with the simulation speed desired at the time of design.

Thus, in the PIL simulation environment of the single-core microcomputer in the conventional techniques, it has been impossible to divide a code generated by a controller designed as a model into a plurality of CPU cores, evaluate a manner of the division by also taking into account the effect of communication overhead due to the division and the like, and plan the allocation of tasks constituting a controller program to the cores.

If a development environment for planning the allocation to cores is implemented, a transient state or the like that cannot be computed by a microcomputer within a predetermined cycle can be detected in a vehicle control system which is designed with a very short control cycle as described above and which is required to have an extremely high degree of real-timeness. Accordingly, there is a need for a technique for considering and determining, based on a result of the detection, control of an actuator by a control value during a previous cycle, and improvement in control speed by providing the computing process function as hardware, in a step prior to system design.

SUMMARY OF THE INVENTION

In accordance with one embodiment, there is provided a performance verification device for generating a source code for verifying performance of a control system. The performance verification device includes a display device and a processor device. The processor device is configured to: select a code generation range as an object of simulation of a program to be executed in a multi-core processor, from a model of a control system displayed on the display device; accept designation of a plurality of parallel executable units as an object of a parallel process out of a plurality of processes included in the code generation range; associate each of the parallel executable units with a corresponding one of cores included in the multi-core processor; designate a sequence of execution of each of the associated parallel executable units, and synchronization between the cores; generate a source code as an object of execution by the multi-core processor, based on each of the parallel executable units and the sequence of execution; execute the generated source code in the multi-core processor, and communicate with the multi-core processor in order to perform cooperative simulation with a plant model executed in a model simulator; and measure an execution time of the program executed in the multi-core processor in the cooperative simulation.

In one aspect, control of an actuator by a control value during a previous cycle, and improvement in control speed by providing the computing process function as hardware can be considered and determined in a step prior to system design.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram illustrating an example of parallelized codes generated in a process (5) of procedure 4.

DESCRIPTION OF THE PREFERRED EMBODIMENTS

Figure 1:
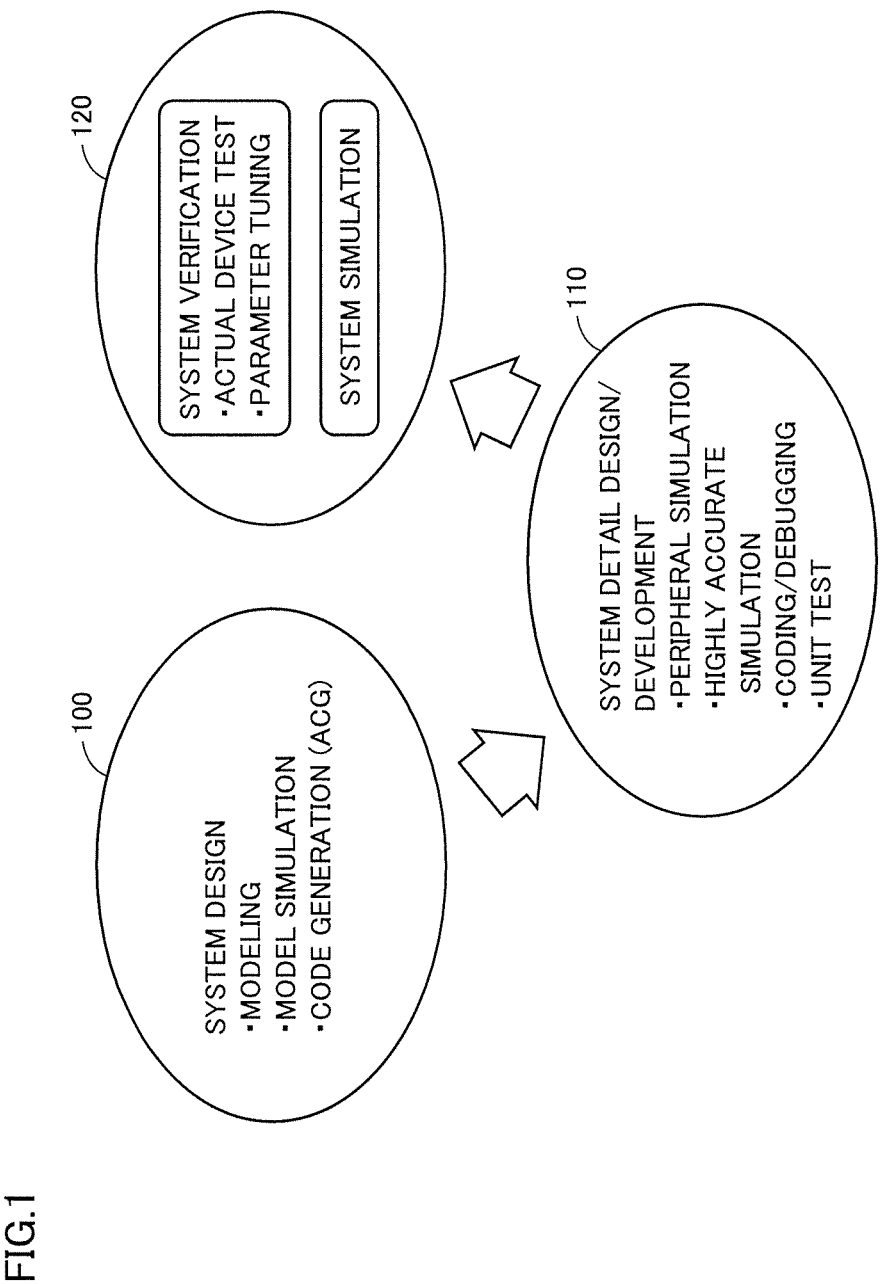
FIG. 1 is a diagram illustrating a system design flow.

Embodiments of the present invention will be described below with reference to the drawings. In the following description, the same components are designated by the same reference characters, and they also have the same names and functions. Thus, the detailed description thereof will not be repeated.

The following documents are cited in the following embodiments:

Non-Patent Document 1: Automatic Parallelization of Simulink Applications, Proceedings of the 8th Annual IEEE/ACM International Symposium on Code Generation and Optimization, Apr. 24-28, 2010, pages 151-159

Non-Patent Document 2: Designing Evaluation Functions of Multi Core Task Mapping for Hard Real-Time Systems, Information Processing Society of Japan SIG Technical Report, 2011-SLDM-149(16), Mar. 18, 2011, pages 1-6

Non-Patent Document 3: Implementation of Embedded Control Systems on Multi-Many-Core Processors, The Society of Instrument and Control Engineers, "Journal of the Society of Instrument and Control Engineers" 53(12), December 2014, pages 1111-1116

With reference to FIG. 1, the outline of system design is described. FIG. 1 is a diagram illustrating a system design flow.

In a phase 100, system design is carried out. The system design includes modeling, model simulation, auto code generation (AGC), and the like. In phase 100, for example, MIL simulation or PIL simulation is performed. In the MIL simulation, for modeling of control, simulation of a controlled object and a controller is performed in a model simulator (for example, MATLAB) running on a PC. In this case, the simulation itself is performed at high speed, with importance placed on the level of detail and accuracy. However, an execution time of a control cycle of the plant and the controller is not simulated. In SIL simulation, it is determined whether or not the control is established with a code base generated from the model. For example, a code generated from a controller model is executed on a PC, and simulated in cooperation with the aforementioned model simulator. In this SIL simulation, the operation or the scale of processing as software is determined.

In a phase 110, system detail design/development is performed. For example, peripheral simulation, highly accurate simulation, coding/debugging, and a unit test are performed. In phase 110, simulation in a PIL simulation environment is performed. For example, a code generated from the controller model is executed on a microcomputer, and cooperative simulation with the model simulator is performed. While this simulation itself is low speed, the throughput of the microcomputer can be detected.

In a phase 120, system verification and system simulation are performed. The system verification may include, for example, an actual device test and parameter tuning.

Figure 2:
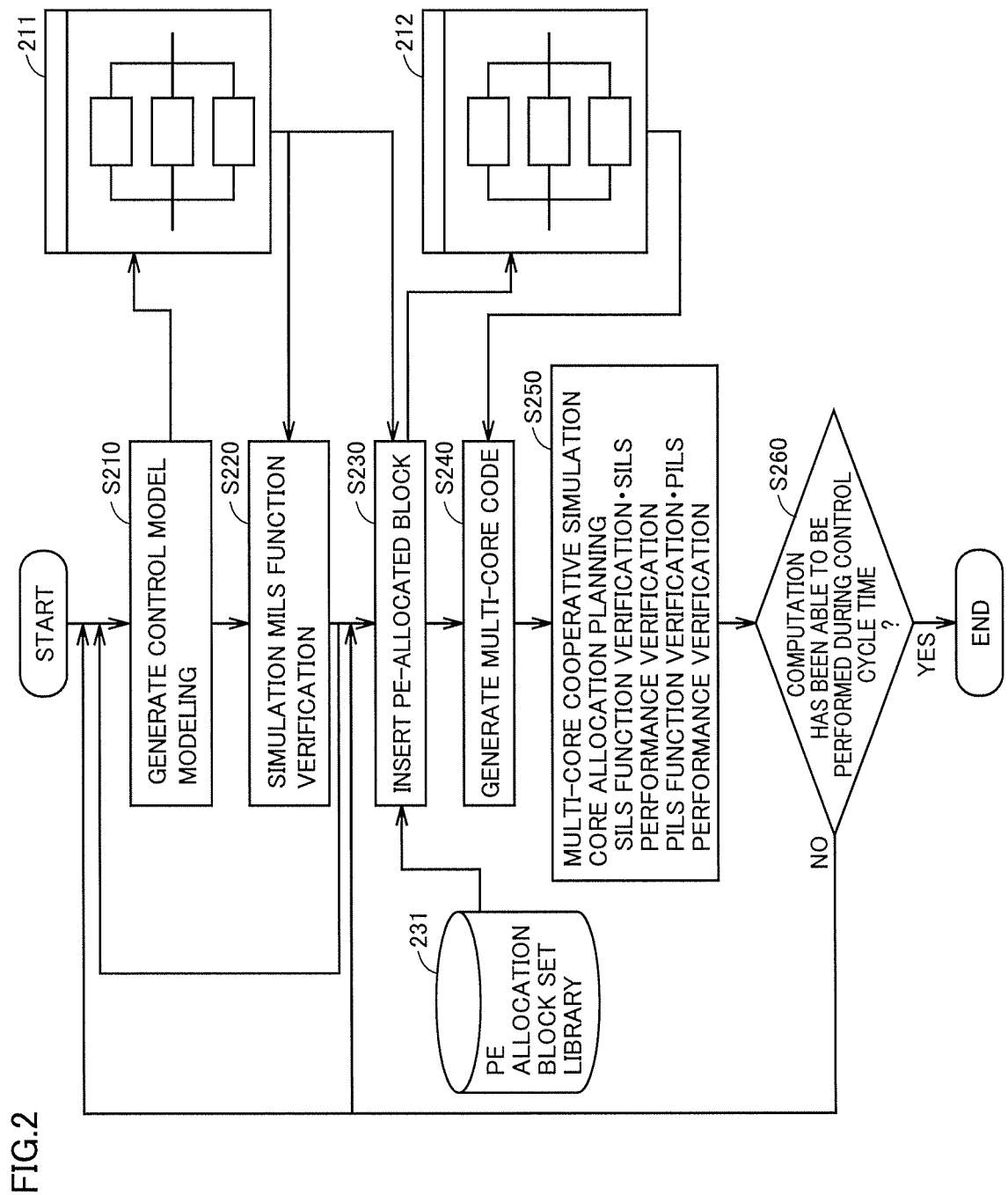
FIG. 2 is a flowchart illustrating a process flow in which the system design is carried out.

With reference to FIG. 2, a control structure of a performance evaluation system according to this embodiment is described. FIG. 2 is a flowchart illustrating a process flow in which the system design is carried out. In one aspect, the performance evaluation system includes a computer operating as a performance evaluation device, and a multi-core processor for executing a source code generated by the performance evaluation device.

In step S210, a control model is generated (modeling). As shown on a screen 211, a block line diagram before PEs (processor elements) are allocated is displayed as the model.

In step S220, simulation is performed. For example, MILS function verification is performed.

In step S230, blocks to which the PEs have been allocated are inserted in the block line diagram. As shown on a screen 212, blocks and the PEs allocated to the blocks are displayed in the block line diagram.

In step S240, a multi-core code is generated.

In step S250, multi-core cooperative simulation is performed. For example, core allocation planning is performed. More specifically, SILS function verification, SILS performance verification, PILS function verification, PILS performance verification and the like are performed.

In step S260, it is determined whether or not computation has been able to be performed during a control cycle time. If the computation has been able to be performed during the control cycle time (YES in step S260), the process ends. If not (NO in step S260), the process returns to step S210, or returns to step S230 where different allocation is performed.

[Outline of System Model]

Figure 3:
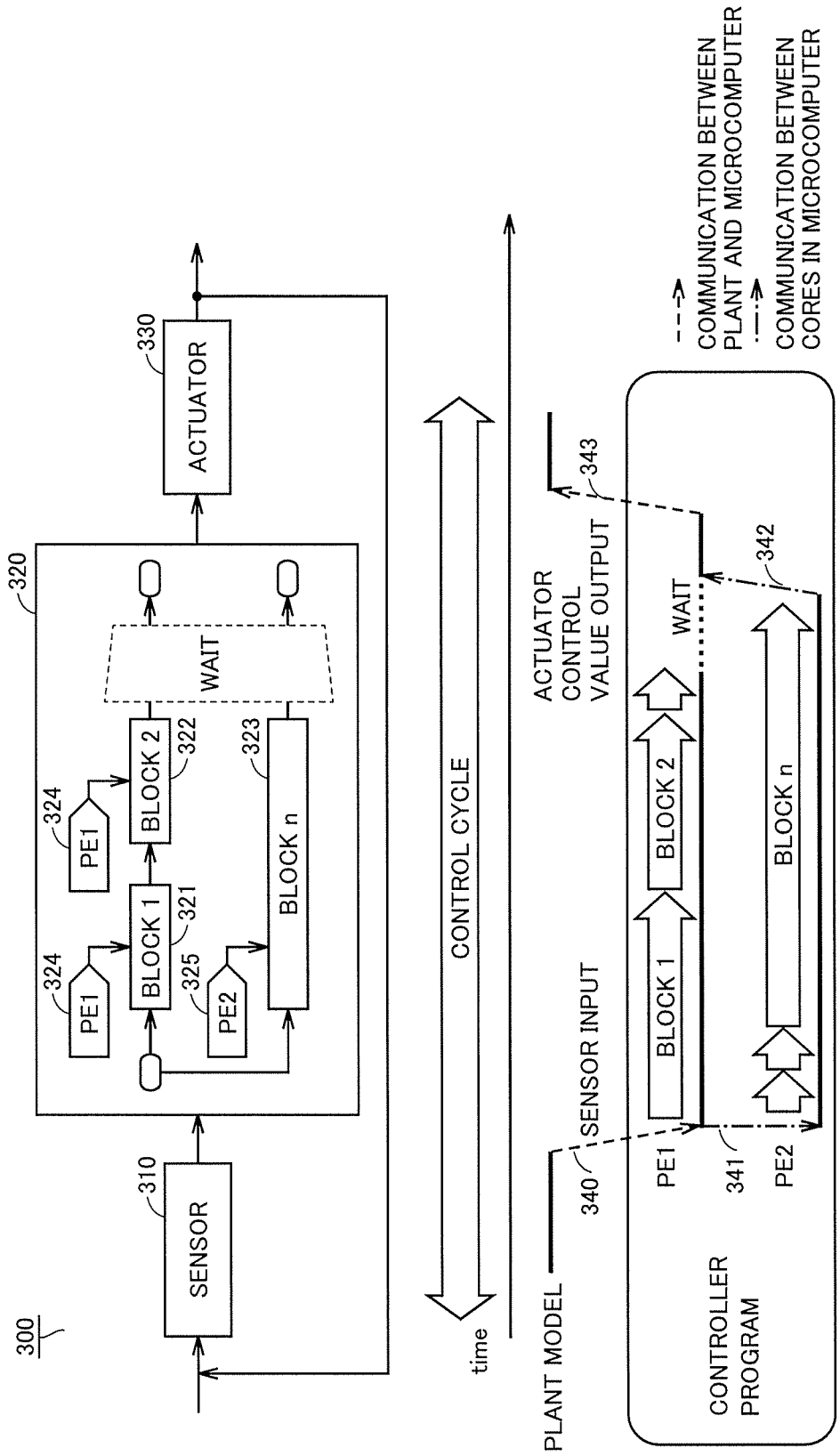
FIG. 3 is a diagram illustrating the outline of a system model 300.

With reference to FIG. 3, a system model 300 according to this embodiment is described. FIG. 3 is a diagram illustrating the outline of system model 300.

System model 300 includes a sensor 310, a controller model 320 and an actuator 330. Controller model 320 includes a first block 321, a second block 322 and an nth block 323. First block 321 and second block 322 are each associated with a PE 324. Nth block 323 is associated with a PE 325. The output of sensor 310 is input to controller model 320. The output of controller model 320 is input to actuator 330. The output of actuator 330 is fed back to sensor 310.

In FIG. 3, sensor 310 and actuator 330 are controlled objects, and are simulated as the plant model by a model simulator on a PC. In a function modeling step early in the control design process, controller model 320 is simulated by the model simulator on the PC. Controller model 320 can be converted, by a tool called the coder provided in an MBD development environment, into a source program that behaves similarly to the model. The source program can be used for verification of SIL simulation. Furthermore, controller model 320 can also be converted into a source program intended for a microcomputer, and can be used for verification of PIL simulation.

In this embodiment, the control cycle refers to a period of time from the input to sensor 310 to the output of a control value to actuator 330. In this case, a code for controller model 320 is provided to each of PE 324 and PE 325. For example, when PE 324 detects first block 321 and second block 322 from the code input to controller model 320, PE 324 executes instructions included in these blocks. When PE 324 detects another block, PE 324 does not perform any process upon determining that the block is not associated with PE 324.

Similarly, when PE 325 detects first block 321 and second block 322, PE 325 does not execute the instructions included in these blocks upon determining that they are not the blocks associated with PE 325. Then, when PE 325 detects nth block 323, PE 325 executes an instruction included in nth block 323.

Communications 340 and 343 correspond to communication between the plant and the microcomputer. Communications 341 and 342 correspond to communication between cores in the microcomputer.

Figure 4:
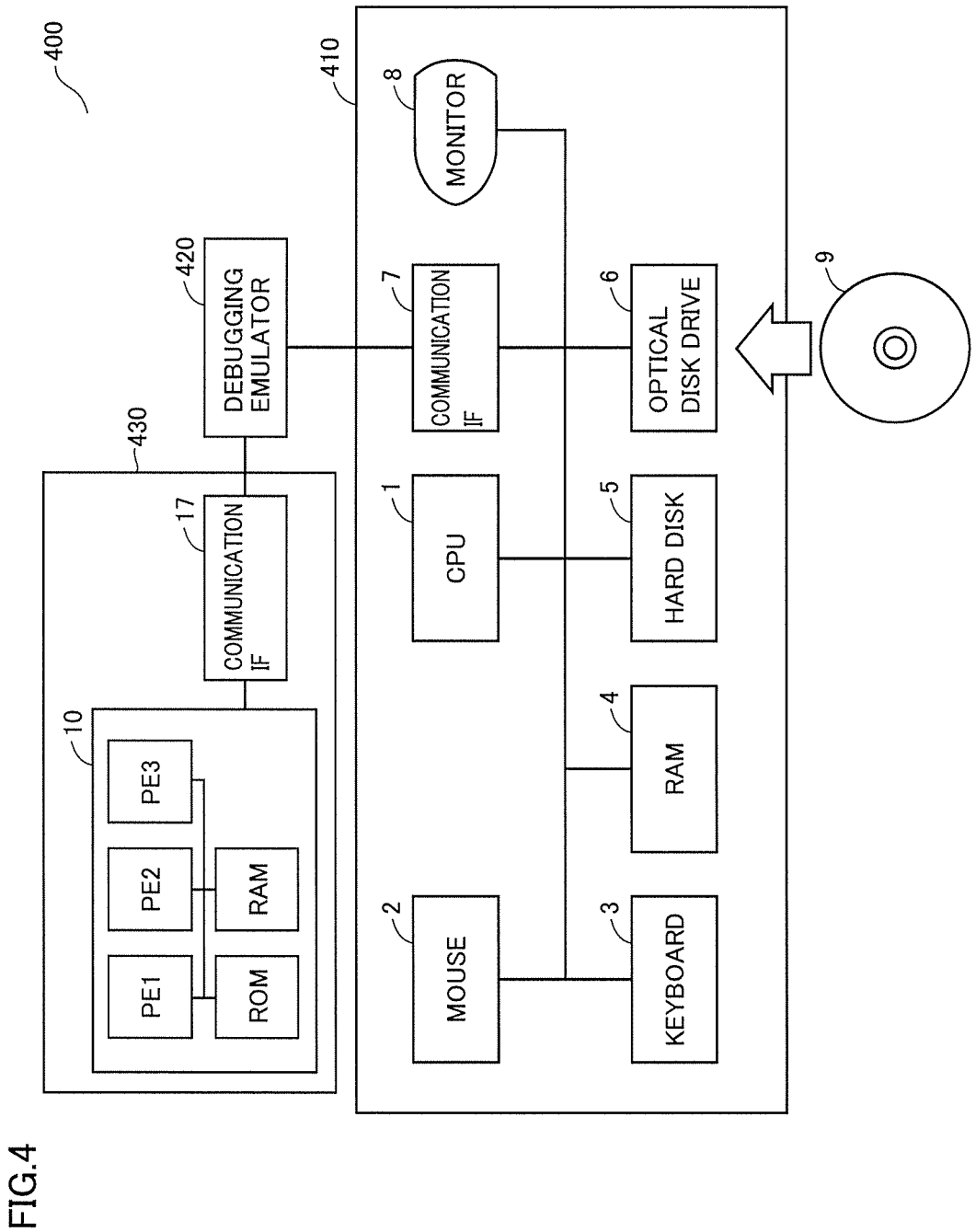
FIG. 4 is a block diagram illustrating a hardware configuration of a computer 400 functioning as the device.

With reference to FIG. 4, the configuration of the device according to this embodiment is described. FIG. 4 is a block diagram illustrating a hardware configuration of a device 400. Device 400 includes a computer 410, a debugging emulator 420 and a microcomputer evaluation board 430. Microcomputer evaluation board 430 includes a multi-core processor 10 and a communication IF (interface) 17.

Debugging emulator 420 serves as a device which is connected to computer 410, communicates with the multi-core processor mounted on microcomputer evaluation board 430, controls the execution of the microcomputer, and obtains a result of the execution. Debugging emulator 420 is generally used in the development of a control system using a microcomputer, and thus the detailed description will not be repeated.

Computer 410 includes, as main components: a CPU 1 for executing a program; a mouse 2 and a keyboard 3 for accepting input of an instruction from the user of computer 410; a RAM (random access memory) 4 for storing in a volatile manner data generated by the execution of the program by CPU 1, or data input through mouse 2 or keyboard 3; a hard disk 5 for storing the data in a non-volatile manner; an optical disk drive 6; a communication IF 7; and a monitor 8. These components are connected to one another by a bus. Optical disk drive 6 has a CD-ROM 9 or another optical disk mounted thereon. Communication IF 7 includes, but not limited to, a USB (universal serial bus) interface, a wired LAN (local area network), a wireless LAN, and a Bluetooth (registered trademark) interface. CPU 1 may have a built-in timer.

Processing in computer 410 is performed by each piece of hardware, and software implemented by CPU 1. Such software may be stored in hard disk 5 in advance. Alternatively, the software may be stored in a non-transitory manner in CD-ROM 9 or another computer-readable non-volatile data recording medium, and distributed as a program product. Alternatively, the software may be provided as a downloadable program product by an information provider connected to the Internet or another network. Such software is read from the data recording medium by optical disk drive 6 or another data reader, or is downloaded through communication IF 7, then temporarily stored in hard disk 5. The software is read from hard disk 5 by CPU 1, and stored in RAM 4 in an executable program format. CPU 1 executes the program.

The components forming computer 410 shown in FIG. 4 are general components. Thus, it can be said that the most essential part according to this embodiment is the program stored in computer 410. The operation of each piece of hardware of computer 410 is well known, and thus the detailed description will not be repeated.

The data recording medium is not limited to a CD-ROM, an FD (flexible disk), or a hard disk, but may be a non-volatile data recording medium containing a program thereon in a fixed manner, such as a magnetic tape, a cassette tape, an optical disk (MO (magnetic optical disk)/MD (mini disk)/DVD (digital versatile disk)), an IC (integrated circuit) card (including a memory card), an optical card, and a semiconductor memory such as a mask ROM, an EPROM (electronically programmable read-only memory), an EEPROM (electronically erasable programmable read-only memory), and a flash ROM.

The program as used herein may include not only a program directly executable by the CPU, but also a program in a source program form, a compression-processed program, an encrypted program and the like.

Figure 5:
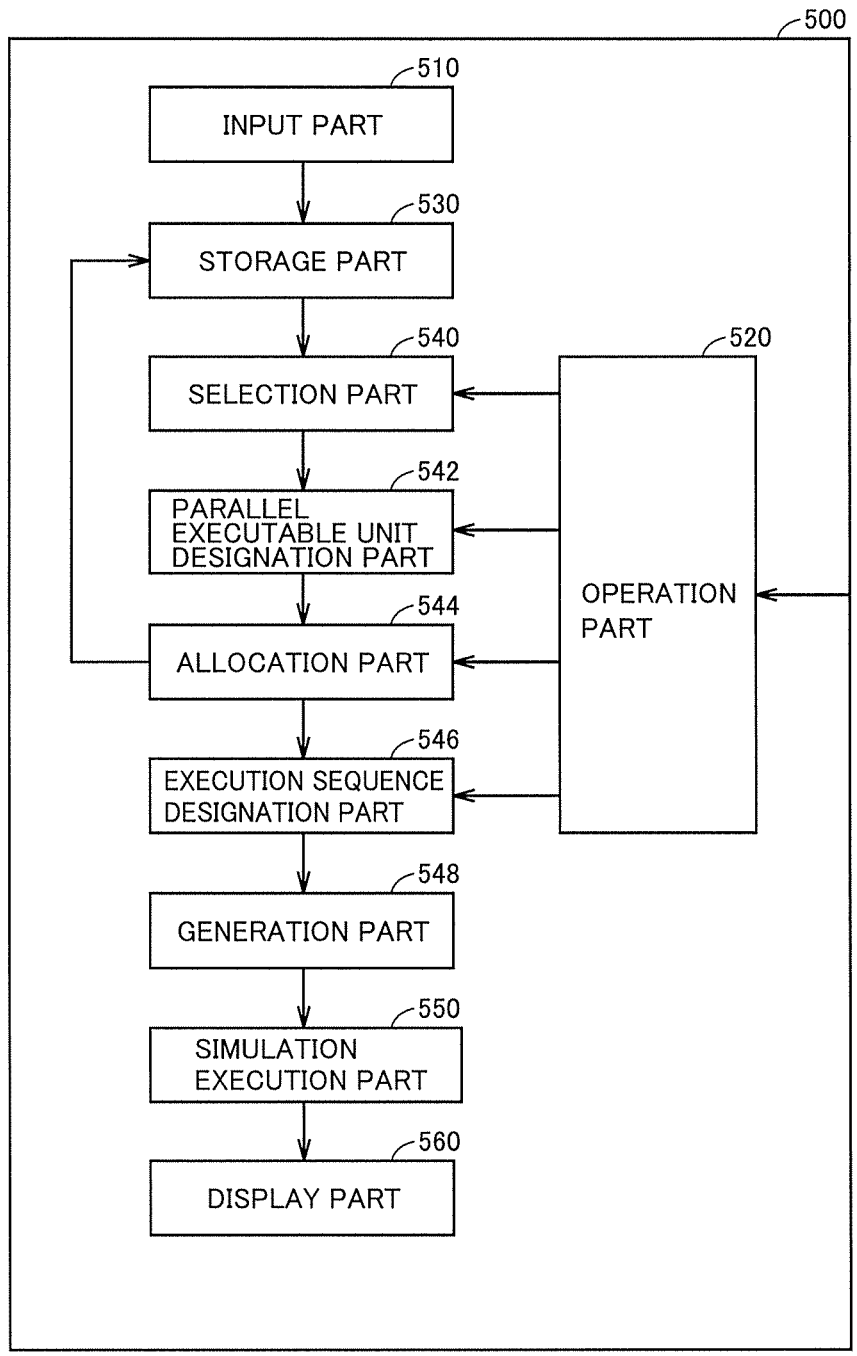
FIG. 5 is a block diagram illustrating the configuration of a function implemented by a performance verification device 500.

With reference to FIG. 5, the configuration of a performance verification device 500 according to this embodiment is further described. FIG. 5 is a block diagram illustrating the configuration of a function implemented by performance verification device 500. Performance verification device 500 can be implemented by, for example, computer 410.

Performance verification device 500 includes an input part 510, an operation part 520, a storage part 530, a computing device, and a display part 560 corresponding to a display device. The computing device includes a selection part 540, a parallel executable unit designation part 542, an allocation part 544, an execution sequence designation part 546, a generation part 548, and a simulation execution part 550. The computing device is mainly implemented by CPU 1.

Input part 510 accepts input of a code or another data to performance verification device 500. Input part 510 is implemented by, for example, Ethernet (registered trademark), a wired or wireless LAN, or another communication interface.

Operation part 520 accepts operation by the user of performance verification device 500. Operation part 520 is implemented by, for example, a mouse, a keyboard, or another input device.

Storage part 530 stores data provided to performance verification device 500 or data generated in performance verification device 500. Storage part 530 is implemented by, for example, a non-volatile memory (such as a hard disk, a flash memory), or a RAM or another volatile memory.

Selection part 540 accepts selection of a code generation range as an object of simulation of a program executed in the multi-core processor, from a model of a control system displayed on display part 560. In one aspect, selection part 540 selects a code generation range in response to, for example, an instruction from the user provided to operation part 520.

Parallel executable unit designation part 542 accepts, in response to the operation on operation part 520, designation of a plurality of processes as an object of a parallel process out of a plurality of processes included in the code generation range selected by selection unit 540. The designated processes will be hereinafter referred to as "parallel executable units."

Allocation part 544 associates each of the parallel executable units with a corresponding one of cores included in the multi-core processor, based on the operation accepted by operation part 520 and the parallel executable units designated by parallel executable unit designation part 542. Data representing the associated state is held in storage part 530.

Execution sequence designation part 546 designates a sequence of execution of each of the associated parallel executable units, based on the operation on operation part 520 and the data associated by allocation part 544.

Generation part 548 generates a source code as an object of execution by the multi-core processor, based on the sequence designated by execution sequence designation part 546, and each of the parallel executable units. The source code includes a communication process with a model simulator for each cycle, and is commonly used for each of the cores.

Simulation execution part 550 converts the source code generated by generation part 548 into a multi-core processor executable format, and causes the converted code to be executed by the multi-core processor through the debugging emulator and the like, to perform PIL simulation with the model simulator.

Display part 560 accepts input of a result of the simulation of the model of the control system or the generated source code, and displays the input data. Display part 560 is implemented by, for example, a liquid crystal monitor or an organic EL (electro luminescence) monitor.

FIRST EXAMPLE

In a first example, a parallelized source code operated with multiple cores is generated through a series of procedures described below, to provide an environment in which function verification can be performed in MIL simulation or SIL simulation. In this environment, a single source program created by a coder from a model file is shared and executed by a plurality of cores.

The series of procedures includes the following procedures, for example:

(Procedure 1): CPU 1 detects that a code generation range as an object of PIL simulation has been selected and designated;

(Procedure 2): CPU 1 detects that parallelized units have been designated within the selected range;

(Procedure 3): CPU 1 detects that a core to be allocated for each parallelized unit has been designated;

(Procedure 4): CPU 1 detects designation of control of a sequence of execution between the parallelized units to which the cores have been allocated, and designation of core synchronization at the start and the end of each control cycle, and generates a code; and (Procedure 5): CPU 1 causes monitor 8 to display execution time information by PIL simulation in which a plant model on a model simulator and a controller program on multiple cores cooperate with each other.

In procedure 1, the user first selects, by PIL simulation, the code generation range within the control cycle to be executed by a multi-core microcomputer.

In procedure 2, the user divides the selected code generation range into parallel executable units, and defines the divided units as blocks.

In procedure 3, the user associates each block of the parallel executable units with a corresponding core, in order to designate a core that executes a process of the block. The block of the parallel executable unit will be hereafter referred to as a parallel unit block, and the block for which the core allocation has been designated will be referred to as a core allocation designated block:

Each core that executes a code reads, for each parallel unit block, a core number (for example, PE 1, PE 2, etc.) designated by the associated core allocation designated block, and a core number held as a hardware function in each PE within the multi-core microcomputer. Each core compares the designated core number with the held core number. When these core numbers match each other, the core is set to generate a source code as a conditional execution statement for executing a code generated for the corresponding block. If these core numbers do not match each other, on the other hand, the core is set not to execute a code generated for the corresponding block.

Furthermore, the setting for this parallel unit block must also include setting required when a plurality of blocks to be executed in one control cycle are executed in parallel by a plurality of cores (for example, setting for controlling a sequence of the execution). In addition, in order to the plant model and the multiple cores to be cooperated while a code series corresponding to one control cycle is executed by a plurality of cores, setting for synchronization between the cores to synchronize the start and the end corresponding to one control cycle needs to be included. Thus, in procedure 4, the user performs designation for controlling such execution sequence and synchronization between the cores. Then, parallelized codes executable with multiple cores are generated. For the generated parallelized codes, in procedure 5, CPU 1 performs cooperative simulation together with the plant model, and causes monitor 8 to display execution time information during the multi-core execution.

[Model Application Procedure]

With reference now to FIGS. 6 to 11, the description will be given of a case where a model example is applied to the simulation environment according to this embodiment. The model example is, for example, a MATLAB/Simulink-based model example.

(Designation of Code Generation Unit)

Figure 6:
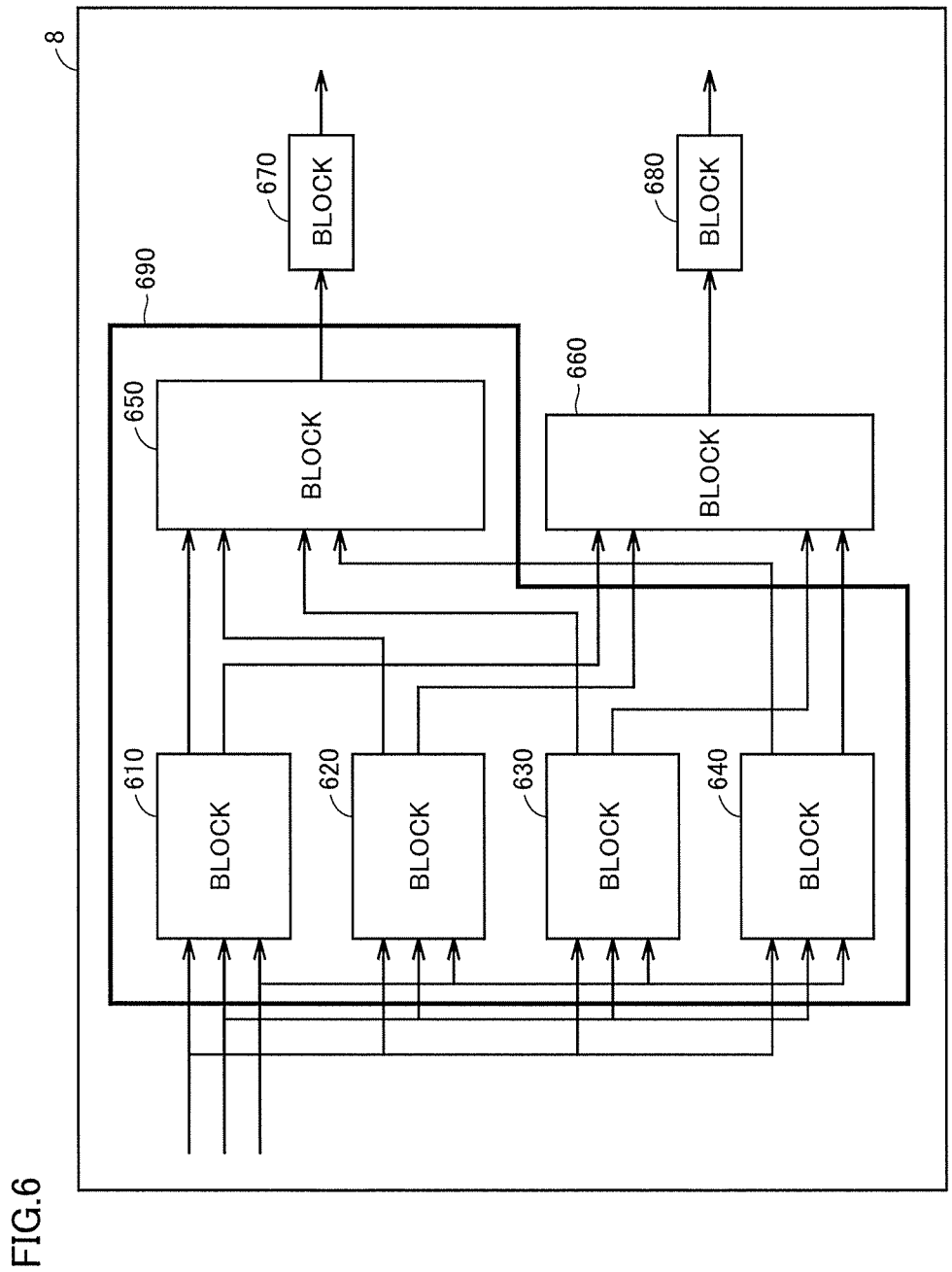
FIG. 6 is a diagram illustrating a manner in which a subsystem is selected from a model.

FIG. 6 is a diagram illustrating a manner in which a subsystem is selected from the model. In one aspect, with regard to procedure 1, in a Simulink environment, for example, a code generation unit by the coder can be designated by using the function of a Subsystem block and the like provided in Simulink.

For example, monitor 8 displays blocks 610, 620, 630, 640, 650, 660, 670 and 680. The user of performance verification device 500 operates the mouse to designate a region (code generation range) forming a subsystem 690 corresponding to a portion of the model. Subsystem 690 includes, for example, blocks 610, 620, 630, 640 and 650. Subsystem 690 is an object of code generation.

Figure 7:
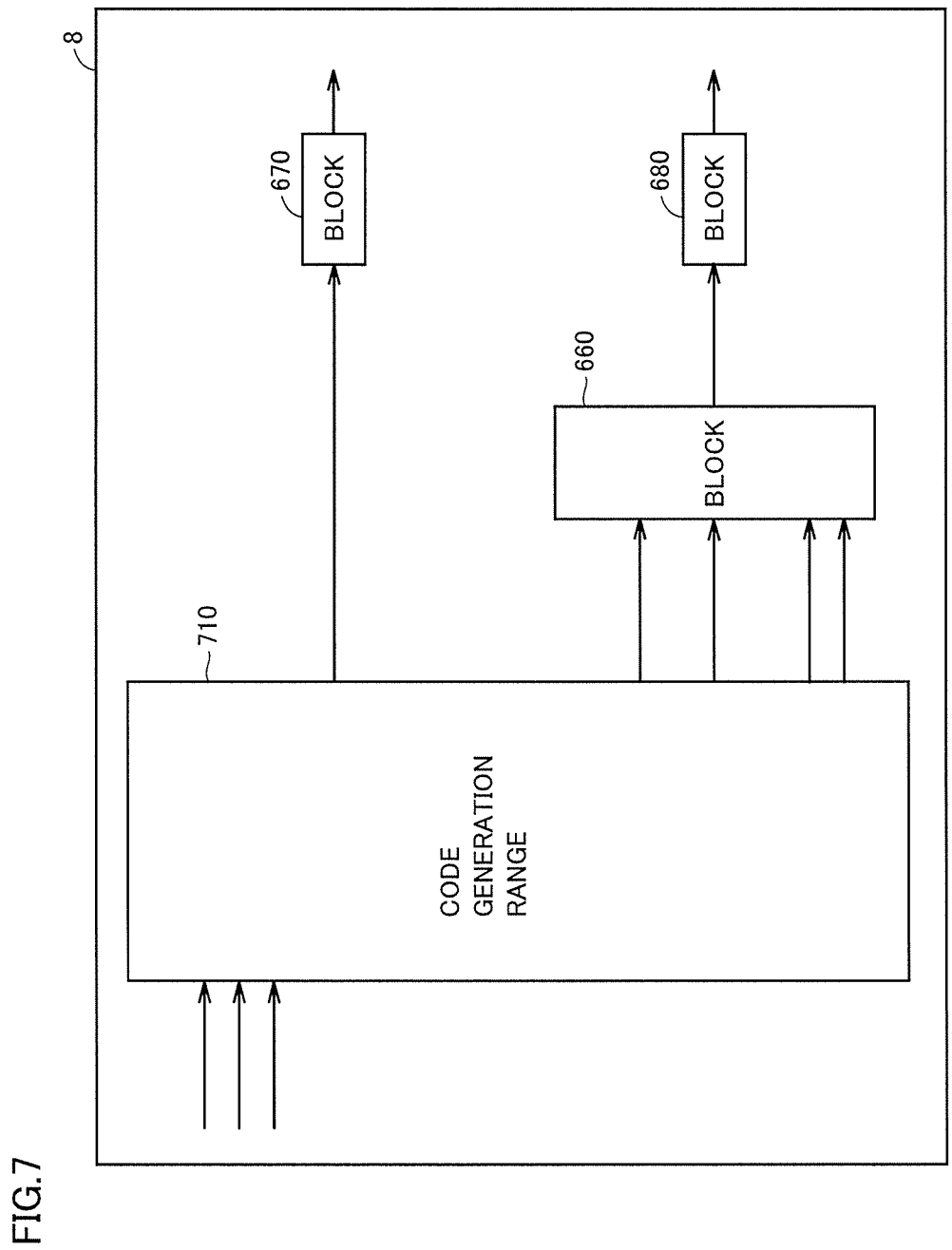
FIG. 7 is a diagram illustrating a state where a subsystem 690 has been replaced by a code generation range 710.

FIG. 7 is a diagram illustrating a state where subsystem 690 has been replaced by a code generation range 710. That is, monitor 8 may display code generation range 710 and blocks 660, 670 and 680.

(Designation of Parallelized Unit)

Figure 8:
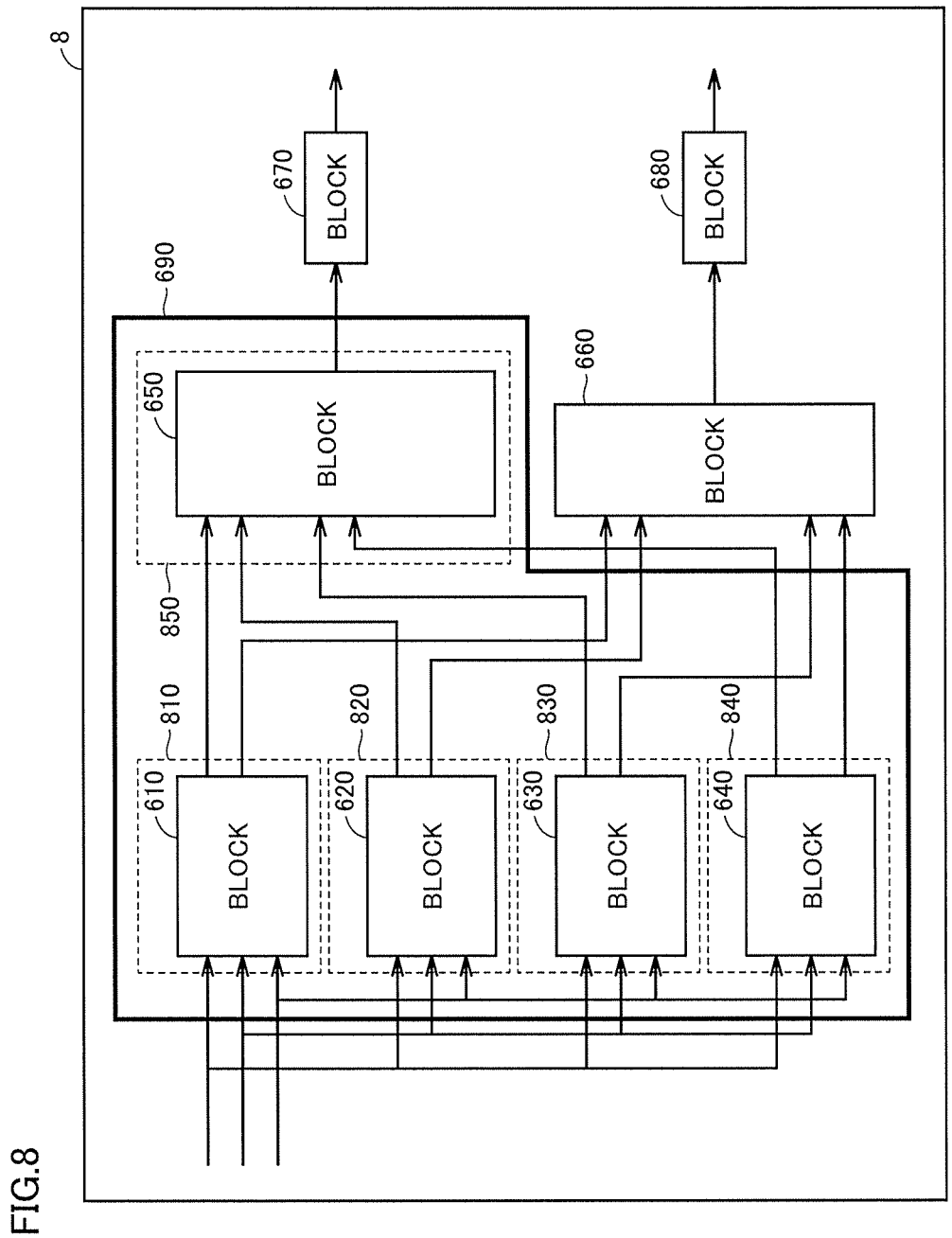
FIG. 8 is a diagram illustrating a display state on a screen when parallelized units are selected.

FIG. 8 is a diagram illustrating a display state on the screen when parallelized units are selected. In this phase, units which can be operated in parallel are separated from the other unit in code generation range 710, and a place holder is set for generating a core allocation execution code for each of the divided units. The place holder is a place temporarily secured so that the actual contents can be inserted therein later. While a core allocation control code is inserted in the place holder in this embodiment, a time measurement code of the corresponding unit may additionally be inserted.

The designation of the parallelized units is implemented by separating units that can be operated in parallel from the other unit by using, for example, the function of an Enabled Subsystem block and the like provided in Simulink. An Enabled Subsystem block can prepare a place holder for generating the core allocation control code and the like for the parallelized units.

Monitor 8 displays parallelized units 810, 820, 830, 840 and 850 based on the operation for the aforementioned purposes by the user. The user can select each block included in code generation range 710 as a parallelized unit.

In the example shown in FIG. 8, blocks 610, 620, 630, 640 and 650 are designated as parallelized units 810, 820, 830, 840 and 850, respectively. That is, each of blocks 610, 620, 630, 640 and 650 is selected as an object of a parallel process in each core of the multi-core processor.

The selection of the parallelized units is performed, for example, such that two or more blocks forming a pair, such as a Goto block and a From block in Simulink, are included in one parallelized unit. Accordingly, for example, in one aspect, two or more blocks forming a pair may exist outside of code generation range 710. Alternatively, in another aspect, two or more blocks forming a pair may be included in the same code generation range.

Figure 9:
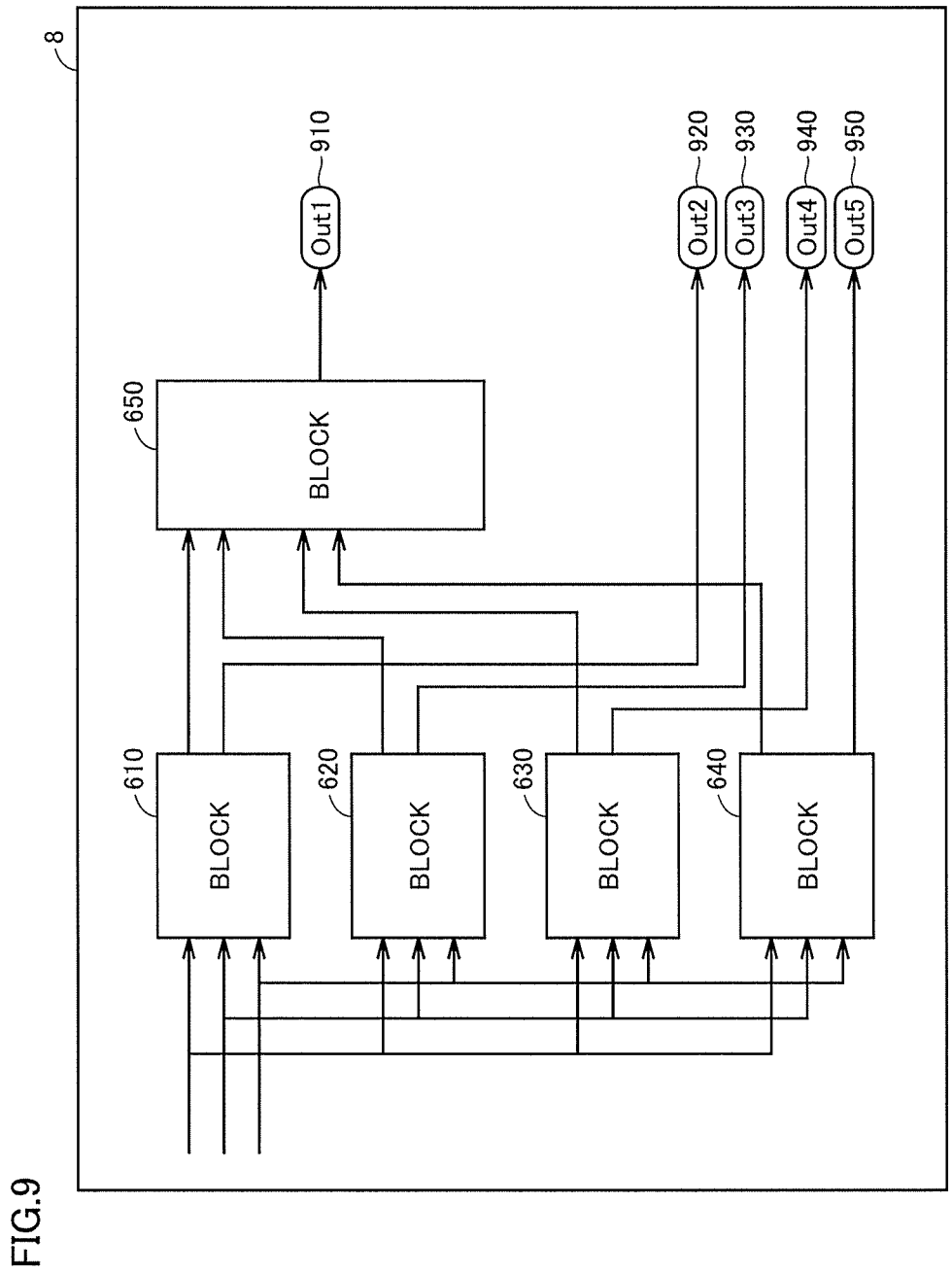
FIG. 9 is a diagram illustrating relation between each block designated as the parallelized unit and the other blocks.

FIG. 9 is a diagram illustrating relation between each block designated as a parallelized unit and the other blocks. Monitor 8 displays blocks 610, 620, 630, 640 and 650 that have been designated as the parallelized units, and output ports 910, 920, 930, 940 and 950.

(Designation of Allocation of Core for Each Parallelized Unit)

Figure 10:
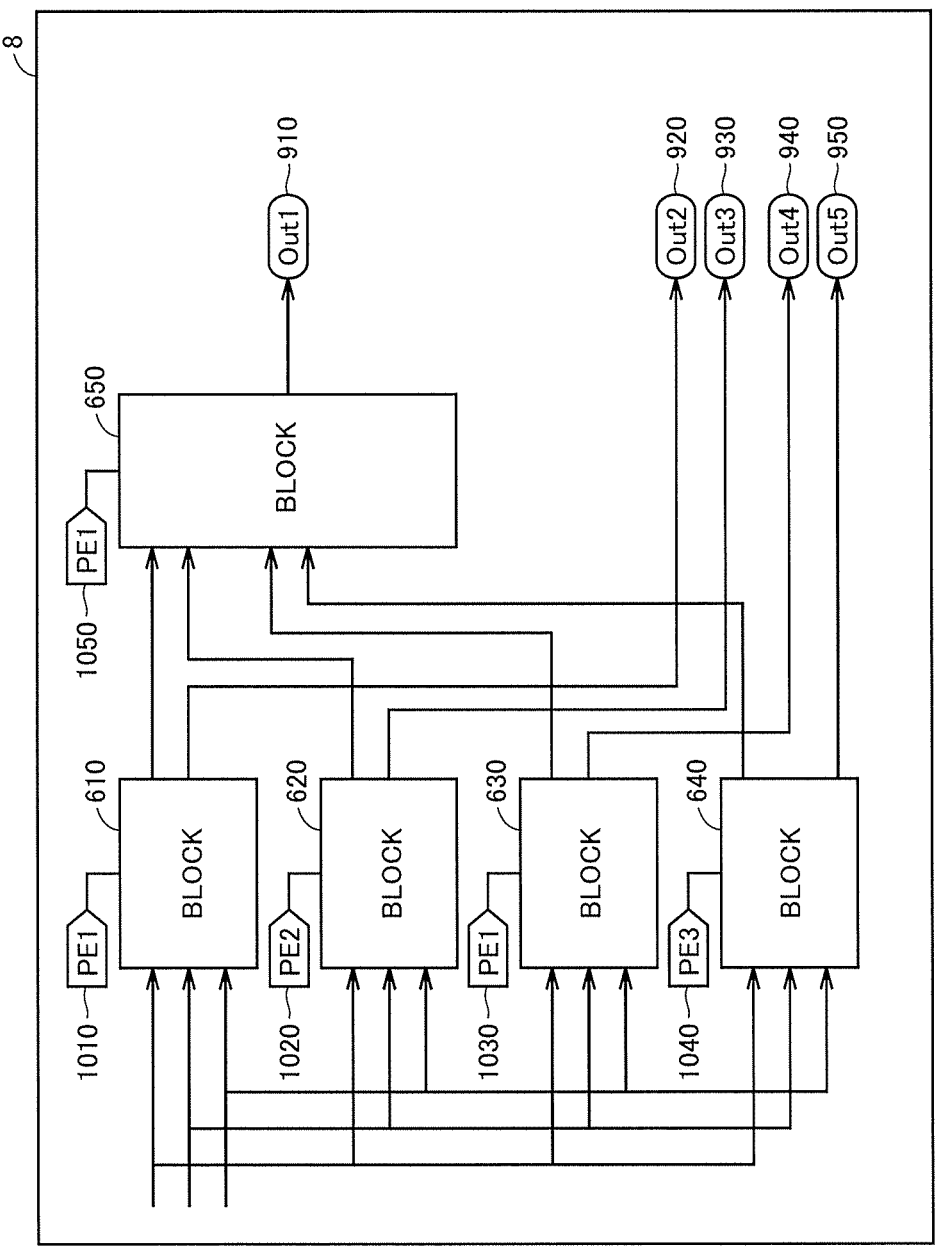
FIG. 10 illustrates a screen for designating core allocation for each parallelized unit (procedure 3).

FIG. 10 illustrates a screen for designating core allocation for each parallelized unit (procedure 3). In procedure 3, a core identification instruction is defined for and connected to each parallelized unit, by using the function of a From block and the like provided in Simulink. For the From block, a core that executes the connected Enabled Subsystem block is designated by a core identification number (for example, PE 1, PE 2, etc.)

By way of example, in one aspect, monitor 8 displays blocks 610, 620, 630, 640 and 650 that have been designated as the parallelized units, an icon representing a PE executing each block, and other output ports 910, 920, 930, 940 and 950. More specifically, block 610, block 630 and block 650 are associated with images 1010, 1030 and 1050 of the first PE (=PE 1), respectively. Block 620 is allocated to an image 1020 of the second PE (=PE 2). Block 640 is allocated to an image 1040 of the third PE (=PE 3). Data representing these allocations is stored, for example, in hard disk 5 of performance verification device 500.

(Control of Execution Sequence and the Like)

Figure 11:
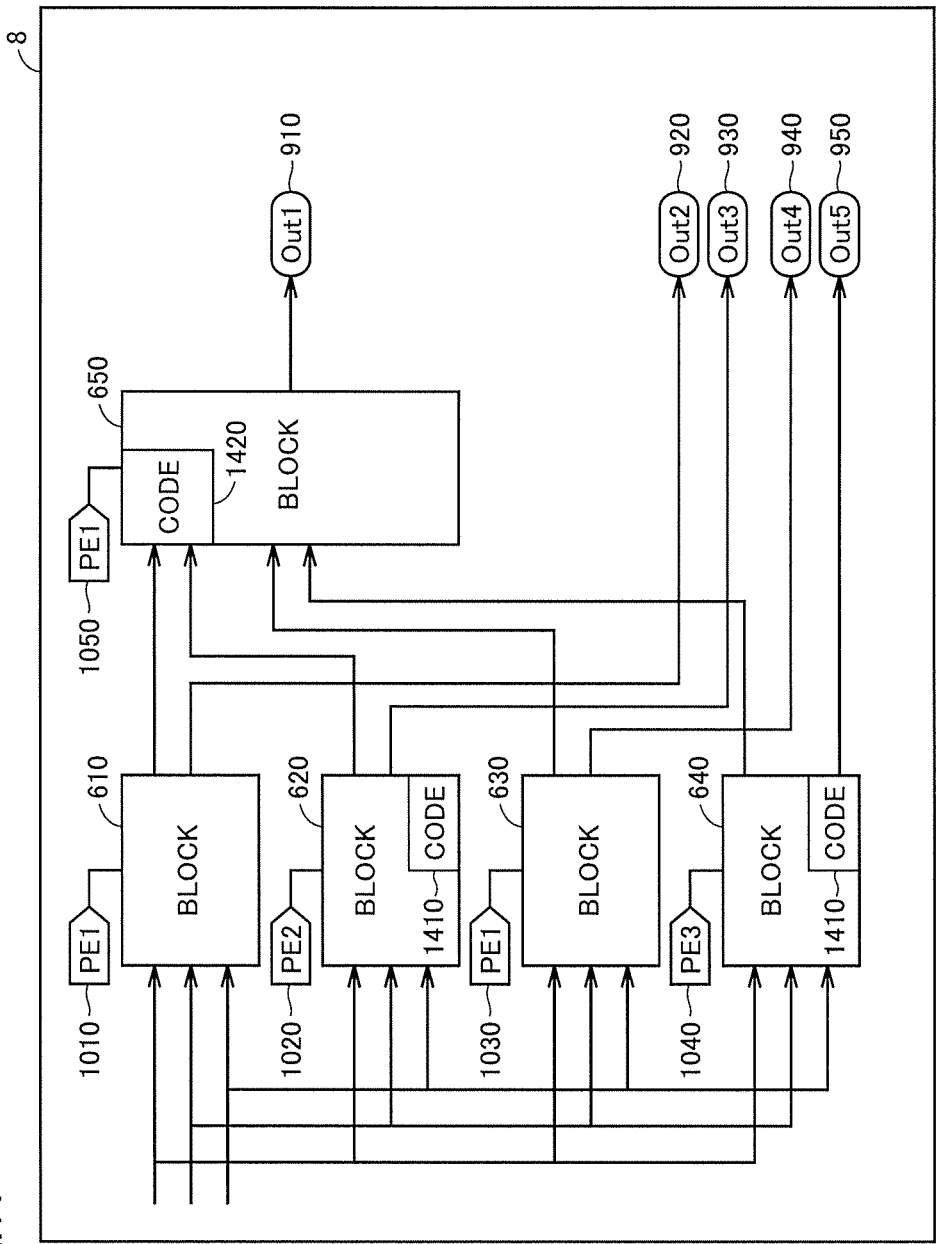
FIG. 11 illustrates a screen for multi-core execution of the parallelized units to which the cores have been allocated, and for generation of a PIL simulation code (procedure 4).

FIG. 11 illustrates a screen for multi-core execution of the parallelized units to which the cores have been allocated, and for generation of a PIL simulation code (procedure 4). That is, as procedure 4, the following processes for controlling the execution sequence and the like are performed:

Process (1): Process for generating, based on the presence or absence of input and output of the parallelized units, a waiting code for controlling the execution sequence between the blocks as a declaration code, an exit code;

Process (2): Process for generating a code to synchronize the start and the end in order to execute a code series corresponding to one control cycle by a plurality of cores;

Process (3): Process for generating a function definition code of a Boolean function for determining the execution core, in order to execute a code series corresponding to the parallelized unit by a designated core;

Process (4): Process for generating, as a core allocation control code, a code calling for the Boolean function for determining the execution core generated as a result of the process (3), in the place holder prepared in procedure 2; and Process (5): Process in which the coder generates a source code for the Subsystem designated in procedure 1, for a model file to which the processes (1) to (4) have been applied.

In the process (1), when one parallelized unit has an input signal corresponding to an output signal from a parallelized unit allocated to another core, the user describes a code waiting for execution of the parallelized unit on the output side as a declaration code. Moreover, when one parallelized unit has an output signal corresponding to an input signal from a parallelized unit allocated to another core, the user describes a code representing the completion of execution as an exit code.

In one aspect, monitor 8 displays blocks 610, 620, 630, 640 and 650, images 1010, 1020, 1030, 1040 and 1050 representing the PEs allocated to the blocks, respectively, and other output ports 910, 920, 930, 940 and 950. Block 620 allocated to PE 2 has an output signal serving as an input signal to block 650 allocated to another core PE 1, and thus has a code 1410 representing the completion of execution described therein as an exit code. Similarly, block 640 allocated to PE 3 has an output signal serving as an input signal to block 650 allocated to another core PE 1, and thus has code 1410 representing the completion of execution described therein as an exit code. Block 650 allocated to PE 1 receives output signals from block 620 and block 640 allocated to other cores as an input signal, and thus has a code 1420 waiting for the completion of execution of block 620 and block 640 described therein as a declaration code. Other block 610 and block 630 allocated to PE 1 do not have a signal between themselves and the parallelized units allocated to the other cores, and thus block 610 and block 630 do not have an execution completion indication code or a waiting code described therein.

In the process (2), the user describes, for the code generation unit designated by the procedure (1), a waiting code for synchronization of all PEs as a declaration code and an exit code.

With reference to FIG. 12, an example of the parallelized codes is described. FIG. 12 is a diagram illustrating an example of the parallelized codes generated in the process (5) of procedure 4.

For example, a code 1210 corresponds to a portion of the function definition code generated by the process (3). A code 1220 and a code 1250 each correspond to a portion of the code for synchronizing the start and the end in a plurality of cores generated by the process (2). A code 1230 corresponds to a portion of the core allocation control code generated by the process (4). A code 1240 corresponds to the waiting code for maintaining the execution sequence between the blocks generated by the process (1).

In procedure 5, the generated parallelized codes are set such that they are executed through the communication IF for PIL simulation. Since all cores have the start and the end synchronized for each control cycle by procedure 4, the communication with the model simulator by the communication IF for PIL simulation can be conducted using any one of the PEs in the multi-core processor. With these parallelized codes for PIL simulation, multi-core processor 10 and a model simulator operating on computer 410 communicate with each other to perform cooperative simulation, whereby an execution time for each control cycle is displayed. The rtiostream interface of The Mathworks, Inc. is an example of such communication IF for PIL simulation. A manner of display on the screen will be described later.

With reference again to FIG. 3, the time chart illustrates an example of execution of the parallelized source codes generated by the procedures described above. When the multi-core microcomputer is notified of the start of one control cycle of the controller, together with an input signal transmitted from a sensor on the model simulator, the plurality of cores included in the multi-core microcomputer execute one parallelization program shared by the plurality of cores. A conditional statement is added to the program such that each core can compare the core identification number included in the core with the core identification number allocated to the block included in the parallelization program, and determine and execute a portion of the parallelization program that should be executed by the core. For example, a program operated on first core 324 (PE 1) receives an output of the sensor on the model simulator, and starts a process that should be computed within the control cycle together with second core 325 (=PE 2). When the computing process is completed, core 324 waits until core 325 completes the computing process. Once core 324 and core 325 complete their respective processes, core 324 notifies the model simulator of the completion of one control cycle of the controller through the communication IF for PIL simulation, and transmits an amount of control to actuator 330 to the model simulator.

In the application example described above, the parallelized source code is generated such that the plurality of cores of the multi-core microcomputer can share the same program code and execute the same code. Alternatively, a not-shared different program code including a piece of code corresponding to the parallelized unit allocated to each core may be generated.

Furthermore, in the application example described above, each procedure has been described as being operated with an MBD tool GUI (graphical user interface). Alternatively, each procedure and each process may be provided as a block set library 231. Block set library 231, which is prepared in advance, includes models of the procedures and the processes. For example, the contents operated by the user as the processes (1) to (4) in the procedure (4) can be prepared in a formulaic manner by the specifications of the multi-core microcomputer, such as core identification information and the number of cores. Therefore, these may be prepared in advance as block set library 231, and provided such that they can be utilized from the MBD tool.

[Display on Screen]

Figure 13:
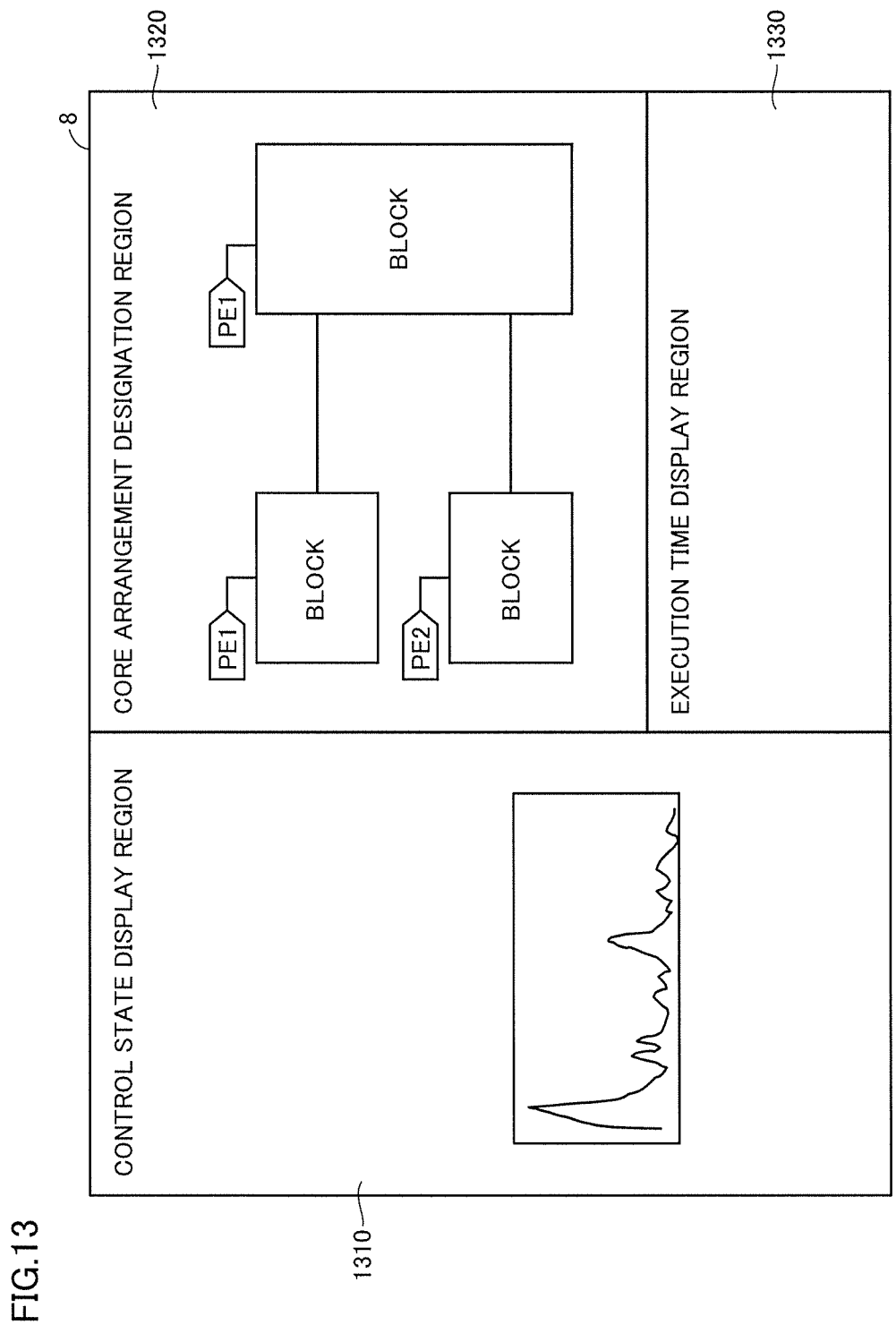
FIG. 13 is a diagram illustrating a state shown on a monitor 8.

With reference to FIG. 13, a manner of display on the screen of performance verification device 500 in another aspect is described. FIG. 13 is a diagram illustrating a state shown on monitor 8.

In one aspect, monitor 8 displays a control state display region 1310, a core arrangement designation region 1320 and an execution time display region 1330. The manner of display of each region is not limited to that shown in FIG. 13.

Control state display region 1310 displays a graph indicating behavior when control simulation is performed using a source code generated by performance verification device 500. Core arrangement designation region 1320 displays an image representing previously created relations between cores and blocks. Execution time display region 1330 is for displaying a time when control is performed by the generated source code.

As described above, according to performance verification device 500 of the first example, the controller program allocated to the plurality of cores can be generated from the control model and can be executed for each control cycle, and the execution time at the multi-core microcomputer can be displayed.

In a method in which each core individually communicates with a plant model running on a model simulator on a PC, a procedure of control of exclusion and synchronization between the cores, and of cooperative communication with the plant model increases in complexity, resulting in a reduction in cooperative simulation speed. By contrast, in this example where one core performs cooperative simulation communication with the plant model, the exclusion and synchronization between the multiple cores can be managed only on the multi-core microcomputer side.

As described above, the first example has illustrated an example where the core allocation is instructed by operation of the GUI, and an example where the block set library for core allocation is prepared and the control model designer indicates the allocation of a core for each block on the model. Alternatively, the allocation instruction may be generated by software that can extract parallelism from a model structure. Non-Patent Document 1 and Non-Patent Document 3 each propose a method of extracting parallelism from a model structure, which is an example of such parallelism extracting technique.

SECOND EXAMPLE

A second example is now described. In the first example, the entire time from the start to the final waiting corresponding to one control cycle is measured. Other than this embodiment, in another aspect, the source code may be generated such that the time from the start of each core to the start of waiting after the computing process in the control cycle is measured. In this case, it can be determined which core takes a long processing time out of the plurality of cores.

In yet another aspect, the code can be generated such that the execution time of each sub-block of the controller block is measured. In this case, an execution time of each sub-block can be obtained, which is useful for reviewing the core allocation when the computation cannot be performed with the control cycle.

That is, in the multi-core PIL simulation environment based on the disclosed technical concept, the following can be displayed:

An execution time of each control cycle of the controller program in the multi-core microcomputer;

Similarly, an execution time until the end of computation for each core in each control cycle; and Similarly, an execution time for each sub-block in each control cycle.

The information thus obtained can be utilized when generating a program capable of attaining an appropriate processing time by a tool performing core allocation, based on a task execution time. Non-Patent Document 2 describes an example of a task mapping method for multi-core processors with hard real-time constraints and a core allocation tool. In Non-Patent Document 2, task mapping can be balanced with task dependencies across cores, a waiting time rate and a disproportionate rate, by introducing an accumulation value of the worst case response time (WCRT) of each task for an evaluation function. The WCRT is a worst-case value of a response time from the release of a job of a task to the completion of the job, and has been extremely difficult to calculate in the case of multiple cores. In the PIL simulation environment according to this embodiment, a value corresponding to this WCRT can be relatively readily obtained.

Meanwhile, as the number of sections to be measured within one control cycle increases, as in the case where the WCRT for each task is obtained, the communication procedures and the simulation time generally increase. It is thus desirable to be able to selectively designate a measurement method suitable for the purpose.

As an example of the measurement method that can be selectively designated, in the first example, the execution time of a section to be measured can be measured using a braking function of the microcomputer (computer 410). Alternatively, the measurement can be made using a debug-tracing function of the microcomputer. In this case, the execution time is calculated from a type stamp and the like provided to each trace information.

Similarly, the execution time of a section to be measured can also be measured using a performance counter function of the microcomputer. In a method using the debug-tracing function or the performance counter function, the number of times that a flow of execution of the control program is interrupted can be reduced as compared to a method using the braking function, thereby increasing the simulation speed.

THIRD EXAMPLE

A third example is now described. In the first example, the PIL simulation process of the controller executed with the plant model and the multiple cores has been described, by taking traditional single-rate signal processing having one sampling frequency as an example. In multi-rate signal processing having a plurality of sampling frequencies, those sampling frequencies are often controlled and designed by frequency multiplication.

The third example is related to a multi-core PIL simulation process in the plant and the controller with sampling frequency multiplication, in which the inside of the controller model is separated for each sampling frequency, and the first example is applied to control of a short cycle required to have a high degree of real-timeness out of a plurality of sampling frequencies. For example, if basic frequency A1 having the shortest cycle and a frequency A2 having a cycle which is twice as long as the cycle of frequency A1 exist as sampling frequencies having short cycles, the inside of the controller model is separated into a group of frequencies A1 and a group of frequencies A2 for each sampling frequency, and the first example is applied to each group. The controller program on the multi-core microcomputer (multi-core processor 10) and the plant model operated on the model simulator on computer 410 communicate with each other for each control cycle of A2, the longest cycle of the sampling frequencies having short cycles, to perform cooperative simulation.

In multi-rate signal processing, a system diagnosis process or the like required to have a relatively low degree of real timeness is often allocated to control of a sampling frequency having a long cycle. Such control of a sampling frequency having a long cycle may be allocated to a PE of a low load after control required to have a high degree of real timeness is preferentially allocated to a PE, and is thus not included in the object of PIL simulation during PIL simulation of the short control cycle described above.

FOURTH EXAMPLE

A fourth example is now described. In the examples described above, the execution time for each control cycle of the controller program obtained by the PIL simulation may be used for SIL simulation on computer 410. In so doing, the program is not executed in multi-core processor 10, but the execution time obtained by the PIS simulation is referred to as the execution time of the corresponding block. According to this method, the accuracy of estimation of the control time of the controller program is improved as compared to the SIL simulation, and high-speed simulation can be implemented as compared to the PIL simulation with multi-core processor 10.

CONCLUSION

A code generated by a controller designed as a model can be divided into a plurality of CPU cores, an evaluation can be made by also taking into account the effect of communication overhead and the like due to the division, and the allocation of tasks constituting a controller program to the cores can be planned.

Although the embodiments the present invention have been described, it should be understood that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A performance verification device for generating a C source code for verifying performance of a control system, the performance verification device comprising:
    a display device; and
    a processor device,
    wherein the processor device is configured to:
    select a code generation range as an object of simulation of a program to be executed in a multi-core processor, from a model of a control system displayed on the display device,
    accept designation of a plurality of parallel executable units as an object of a parallel process out of a plurality of processes included in the code generation range,
    associate each of the parallel executable units with a corresponding one of cores included in the multi-core processor,
    designate a sequence of execution of each of the associated parallel executable units, and synchronization between the cores,
    generate the C source code as an object of execution by the multi-core processor, based on each of the associated parallel executable units and the sequence of execution,
    execute the generated C source code in the multi-core processor, and communicate with the multi-core processor in order to perform cooperative simulation with a plant model, executed in a model simulator, and
    measure an execution time of the program executed in the multi-core processor in the cooperative simulation; and
    wherein the plant model includes a sensor and an actuator, and
    wherein the processor device is configured to determine, based on the execution time, whether or not the program has been able to be performed during a period of time from the input to the sensor to the output of a control value to the actuator.

2. The performance verification device according to claim 1, wherein
    the C source code includes identification information on each core, and a process block associated with each core as an object of a process by the core.

3. The performance verification device according to claim 1, wherein
    the C source code is common to each of the cores.

4. The performance verification device according to claim 1, further comprising an input/output device configured to communicate with the multi-core processor, wherein
    the display device displays a result of the execution of the C source code by the multi-core processor.

5. The performance verification device according to claim 1, wherein
    when accepting the designation of the parallel executable units, two or more processes dependent on each other out of the plurality of processes are excluded from the object of the parallel process.

6. A method for causing a computer to generate a C source code for verifying performance of a control system, the method comprising:
    accepting selection of a code generation range as an object of simulation of a program to be executed in a multi-core processor, from a model of a control system;
    accepting designation of a plurality of parallel executable units as an object of a parallel process out of a plurality of processes included in the code generation range;
    associating each of the parallel executable units with a corresponding one of cores included in the multi-core processor;
    designating a sequence of execution of each of the associated parallel executable units, and synchronization between the cores;
    generating the C source code as an object of execution by the multi-core processor, based on each of the associated parallel executable units and the sequence of execution;
    executing the generated C source code in the multi-core processor, and communicating with the multi-core processor in order to perform cooperative simulation with a plant model, executed in a model simulator;
    measuring an execution time of the program executed in the multi-core processor in the cooperative simulation; and
    wherein the plant model includes a sensor and an actuator, wherein the method further comprises:
    determining, based on the execution time, whether or not the program has been able to be performed during a period of time from the input to the sensor to the output of a control value to the actuator.

7. The method according to claim 6, wherein
    the C source code includes identification information on each core, and a process block associated with each core as an object of a process by the core.

8. The method according to claim 6, wherein
    the C source code is common to each of the cores.

9. The method according to claim 6, further comprising:
    communicating with the multi-core processor; and
    displaying a result of the execution of the C source code by the multi-core processor.

10. The method according to claim 6, wherein designating includes excluding two or more processes dependent on each other out of the plurality of processes from the object of the parallel process.

11. A machine-readable recording medium having a program recorded thereon in a non-transitory manner, the program for causing a computer to perform a method for generating a C source code for verifying performance of a control system,
    the program causing the computer to perform:
    accepting selection of a code generation range as an object of simulation of a program to be executed in a multi-core processor, from a model of a control system,
    accepting designation of a plurality of parallel executable units as an object of a parallel process out of a plurality of processes included in the code generation range,
    associating each of the parallel executable units with a corresponding one of cores included in the multi-core processor,
    designating a sequence of execution of each of the associated parallel executable units, and synchronization between the cores,
    generating the C source code as an object of execution by the multi-core processor, based on each of the associated parallel executable units and the sequence of execution,
    executing the generated C source code in the multi-core processor, and communicating with the multi-core processor in order to perform cooperative simulation with a plant model, executed in a model simulator, and measuring an execution time of the program executed in the multi-core processor in the cooperative simulation; and wherein the plant model includes a sensor and an actuator, and wherein the program further causes the computer to perform:

determining, based on the execution time, whether or not the program has been able to be performed during a period of time from the input to the sensor to the output of a control value to the actuator.

12. The recording medium according to claim 11, wherein the C source code includes identification information on each core, and a process block associated with each core as an object of a process by the core.

13. The recording medium according to claim 11, wherein the C source code is common to each of the cores.

14. The recording medium according to claim 11, wherein the program further causes the computer to perform:
communicating with the multi-core processor, and
displaying a result of the execution of the C source code by the multi-core processor.

15. The recording medium according to claim 11, wherein designating includes excluding two or more processes dependent on each other out of the plurality of processes from the object of the parallel process.

* * * * *